US012783707B2

(12) United States Patent
Segura et al.

(10) Patent No.: US 12,783,707 B2
(45) Date of Patent: Nov. 3, 2026

(54) PROCESSING DATA FORMATTED IN ACCORDANCE WITH AN INTEROPERABILITY STANDARD FOR ELECTRONIC EXCHANGE OF DATA

(71) Applicant: League, Inc., Toronto (CA)

(72) Inventors: Dario Segura, Toronto (CA); Kerry Weinberg, Waltham, MA (US)

(73) Assignee: League, Inc., Toronto (CA)

( * ) Notice: Subject to any disclaimer, the term of this patent is extended or adjusted under 35 U.S.C. 154(b) by 0 days.

(21) Appl. No.: 18/989,867

(22) Filed: Dec. 20, 2024

(65) Prior Publication Data

US 2025/0209196 A1 Jun. 26, 2025

Related U.S. Application Data

(60) Provisional application No. 63/613,900, filed on Dec. 22, 2023.

(51) Int. Cl.
*G06F 21/62* (2013.01)

(52) U.S. Cl.
CPC ................................ *G06F 21/6218* (2013.01)

(58) Field of Classification Search
CPC ....... G06F 21/60; G06F 21/62; G06F 21/6218
See application file for complete search history.

(56) References Cited

U.S. PATENT DOCUMENTS 7,647,318 B1 * 1/2010 Enns ................... G06F 21/6218 707/999.006
2016/0063191 A1 * 3/2016 Vesto ..................... G16H 50/50 705/2
2020/0150885 A1 * 5/2020 Rattan ................... H04L 9/3239
2021/0096926 A1 * 4/2021 Williams ................ H04L 67/34

* cited by examiner

*Primary Examiner* — D'arcy Winston Straub
(74) *Attorney, Agent, or Firm* — Ashurst Perkins Coie US LLP

(57) ABSTRACT

An architectural pattern for a data processing system that utilizes a router to unify all individual instances of functional or capability modules into a single, distributed server. The router in such an architecture is generally configured based on a federated model in which all functional modules are responsible for maintaining their own data stores and communicate with one another indirectly through the router. To facilitate communication between functional modules, the router leverages parameters of the interoperability standard in order to enforce access permissions on and allow for efficient routing of data packets between sources and destinations. Through operation of the router, the functional modules included within the capability layer achieve degrees of autonomy of encapsulation that are advantageous from a design productivity and operational standpoint. By intrinsic processing of data formatted according to the interoperability standard, the functional modules are compatible with both internal and external networked resources.

20 Claims, 7 Drawing Sheets

PROCESSING DATA FORMATTED IN ACCORDANCE WITH AN INTEROPERABILITY STANDARD FOR ELECTRONIC EXCHANGE OF DATA

CROSS-REFERENCE TO RELATED APPLICATIONS

This application claims priority to U.S. Application Ser. No. 63/613,900, filed on Dec. 22, 2023, and entitled PROCESSING DATA FORMATTED IN ACCORDANCE WITH AN INTEROPERABILITY STANDARD FOR ELECTRONIC EXCHANGE OF DATA, the entire contents of which are hereby incorporated by reference.

TECHNICAL FIELD

The disclosure relates generally to a data processing layer and, more particularly, to systems and methods intrinsic processing of data formatted in accordance with an interoperability standard for the exchange of data.

BACKGROUND

Fast Healthcare Interoperability Resources (FHIR™) is a standard for healthcare data exchange created with the aim of facilitating clinical interoperability. For this purpose, FHIR™ defines and enforces a common set of APIs used primarily for data transmission to enable healthcare systems to communicate with each other. The FHIR™ specifications are generally free to use and employ technologies and web standards commonly used across other industries, for example, the REST architectural style of APIs. Developers can combine different components of FHIR™ to target specific clinical use cases or create extensions upon the core specifications.

One of the FHIR™ standard's objectives is to provide a set of data elements (referred to in the standard and herein throughout as "resources") that can be combined together through the use of "references" in order to capture most clinical use cases. Resources are typically not used independently and rather are intended to reference other resources. For example, linking a Patient resource to other resource types, such as an Observation (an assertion concerning a patient), Condition (a diagnosis or issue), or Medication (ingredients, amount, strength of medications, etc.), by way of a reference, allows for different, specific scenarios to be implemented. Extensibility, in the event that a given scenario will not adequately be captured by existing resources, is supported through the use of "profiles" that, in general, can be used to either constrain or extend an existing resource type as required in order to better or more completely describe the scenario presented.

A FHIR™ profile will commonly, but not always, comprise a general requirements section describing its goal, category, and the resource(s) being configured by the profile, a snapshot section presenting a full configuration of the profiled resource, and a differential section to highlight differences between the base resource and as profiled. Some standard FHIR™ profiles have been created and published, while other FHIR™ profiles will be developed by individual users to meet the requirements of a specific project or use case. In any case, profiling a FHIR™ resource can be used to define missing extensions and how API functions and terminologies should be configured.

Substitutable Medical Applications, Reusable Technologies (SMART™) is another open-source, standards-based API that leverages the OAuth 2.0 standard to provide secure, universal access to electronic health records (EHRs). The SMART™ platform builds on and extends the FHIR™ standard and consequently is sometimes referred to as "SMART on FHIR". One of the functions that SMART on FHIR enables is secure authentication of client systems or applications, which it accomplishes in part through the use of "scopes". Scope is a term that originates from the OAuth 2.0 standard to represent the range of functionality requested by, and potentially granted to, a client application by an authorization server. For example, the granted permissions may be actions like read, write, or delete, among others. While the OAuth2.0 standard does not generally define the contents of a scope, only the available permissions that can be granted between client and server, SMART on FHIR does define a pattern for how scopes can be utilized at the resource or profile level.

Scopes are defined in SMART on FHIR in terms of certain pre-defined categories or contexts including, at the clinical data level, both patient-specific scopes (e.g., data or information concerning a particular patient, such as an illness or condition the patient is experiencing) and user-specific scopes (e.g., data or information that a particular user may access, such as an appointment time), as well as system-specific scopes. While scopes were initially utilized for permissioning of FHIR™ resources to be consumed by client applications, enhancements to the SMART on FHIR standard have now also enabled the use of scopes for profiled resources as well.

SUMMARY

In general, the disclosure provides methods and systems for functional modules with capabilities that are mappable to an interoperability standard, such as the FHIR™ standard, to not just exchange data with external systems, clients, or applications by following the interoperability standard, but to also process data intrinsically in the same data format. Thus, functional modules may effectively utilize an interoperability standard as an operational data schema and, in so doing, expose an API that enables both interoperability with third party sources, but with also other internal resources that have been similarly configured. This organizational structure can allow for the federation of data processing systems as a collection of locally encapsulated services, microservices, or generally any other configuration of functional or capability modules, which have both internal and external compatibility and extensibility.

In at least one broad aspect, the embodiments set forth herein disclose a system for processing data formatted in accordance with an interoperability statement for electronic exchange of data. The system may include at least one functional module within a capability layer and a router in electronic communication with each at least one functional module. The at least one functional module are each configured to include a capability statement that imposes at least one operational constraint on the processing of data by the functional module, and to publish at least one scope that imposes a set of permissions and restrictions on the data processed by the functional module, in which the capability statement is defined based on at least one parameter of the interoperability standard, and the at least one scope is defined based on the at least one parameter of the capability statement. The router is configured to, for each at least one functional module, control the flow of data to and therefrom based on the corresponding at least scope published by that functional module and accessed by the router.

In at least one broad aspect, the embodiments set forth herein disclose a method of processing data. The method may include, for each of at least one functional module included within a data processing system, configuring a capability statement that imposes at least one operational constraint of the processing of data by the functional module, and publishing at least one scope that imposes a set of permissions and restrictions on the data processed by the functional module, in which the capability statement is defined based on at least one parameter of an interoperability standard for electronic exchange of data, and the at least one scope is defined based on the at least one parameter of the capability statement. The method may further include receiving a flow of data at a router in electronic communication with each at least one functional module and directing the received flow of data to the at least one functional module selectively based on the corresponding at least scope published by the at least one functional module and accessed by the router.

In at least one broad aspect, the embodiments set forth herein disclose a router for router for controlling the flow of data between at least one functional module included within a data processing system. The router may include a scope registry and a reverse proxy in communication with the scope registry. The scope registry is configured to store, for each of the at least one functional module, at least one scope published by that functional module, in which the at least one scope is defined based on at least one parameter of a capability statement included within the corresponding functional module, and the capability statement imposes at least one operational constraint on the processing of data by that functional module and is defined based on at least one parameter of an interoperability standard for electronic exchange of data within the data processing system. The reverse proxy is configured to route data traffic to and from each at least one functional module by enforcing the corresponding at least one scope stored in the scope registry.

Additional details of these and other aspects of the disclosed embodiments are provided below.

BRIEF DESCRIPTION OF THE DRAWINGS

Reference will be made herein to the accompanying drawings, in which.

For clarity and ease of description, like reference numerals will be used in the drawings to describe the same or like parts.

DETAILED DESCRIPTION

The description which follows, and the embodiments described therein, are provided by way of illustration of example embodiments of the disclosed invention(s). These examples are provided for the purposes of explanation and disclosure and, unless stated explicitly or otherwise inferred from context, are not intended to limit or narrow any aspect or underlying principle of operation or functionality.

Data interoperability standards have been adopted as a way of enabling unrelated systems, clients, or applications to exchange data by providing a common format that will be interpretable by each entity on either side of the exchange. However, such standards do not necessarily provide a conducive schema for internal utilization or processing of data by functional or capabilities modules implemented within a data processing layer. This is, at least in part, because of modern architectural approaches that will often incorporate service or microservice encapsulation to provide a degree of independence between different components of an overall system. Commonly each such encapsulated service or microservice would exercise sovereignty over its own data schema, which tends to decrease scalability and reliability, and reduce the ability of each encapsulated module to interact and exchange data with other modules implemented within the layer.

Embodiments of the invention(s) described herein provide an architectural pattern for a data processing system that utilizes a router to unify all individual instances of functional or capability modules into a single, distributed server. The router in such an architecture is generally configured based on a federated model in which all functional modules are responsible for maintaining their own data stores and communicate with one another only indirectly by way of the router. For its part, the router leverages parameters of the interoperability standard in order to enforce access permissions on and allow for efficient routing of data packets between the functional modules. Through operation of the router, the functional modules included within the capability layer are able to achieve degrees of autonomy of encapsulation that are advantageous from a design productivity and operational standpoint.

Further details of various embodiments of invention(s), including at least one preferred embodiment, will now be provided with reference to the drawings.

Figure 1:
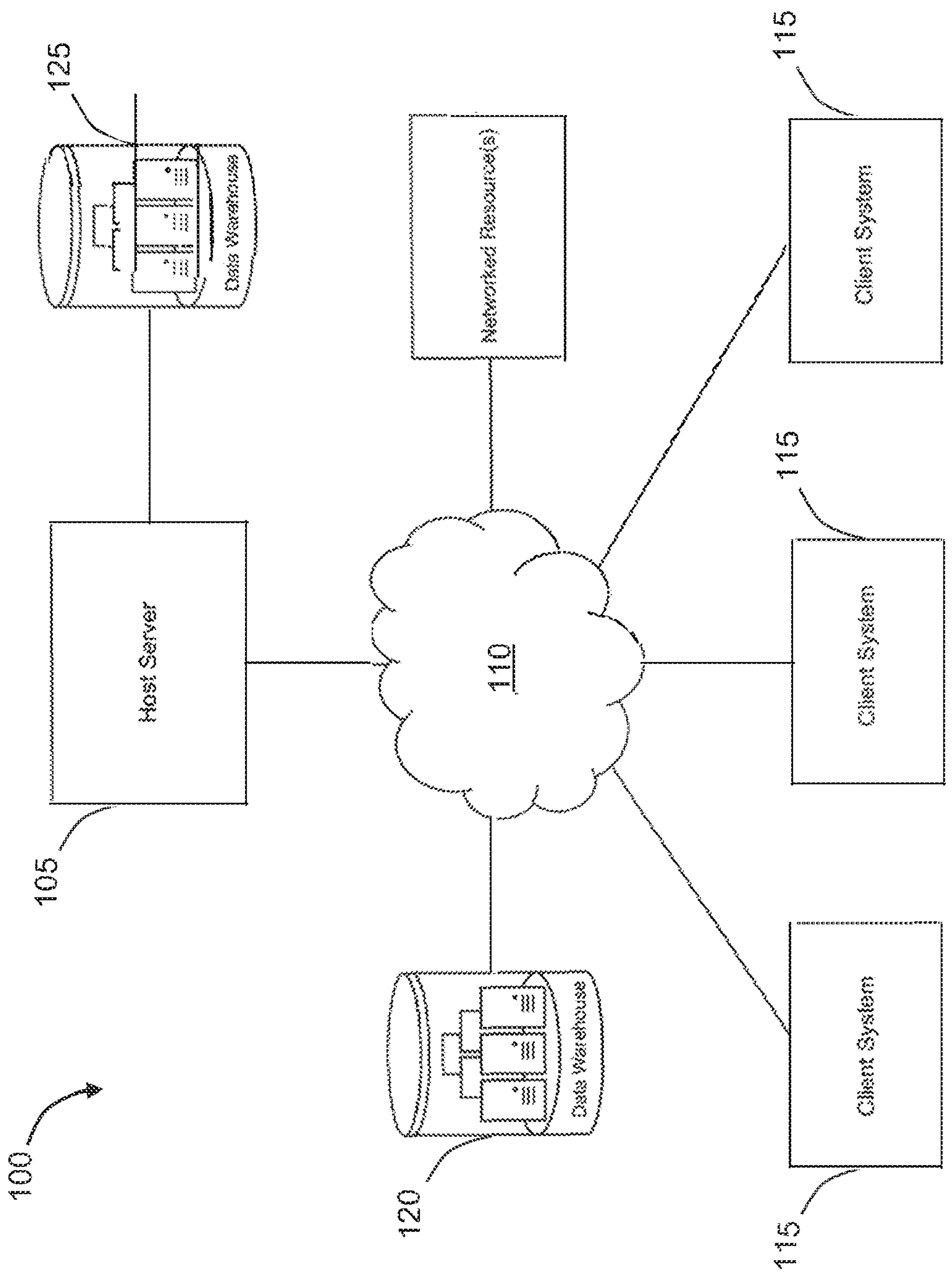
FIG. 1 shows an example data processing system suitable for implementing embodiments of the invention(s) disclosed herein.

Reference is initially made to FIG. 1, which shows an example data processing system 100 that is suitable for implementing the embodiments disclosed herein. As shown, system 100 is structured based on a server-client architecture and may include a host server 105 that is connected to a network 110, which can be any local, wide area, or mobile network, including the Internet, cellular networks, and the like, or any combination of the foregoing. Two or more client systems 115 may be in communication with host server 105 through network 110 and used by individual users to access services, data, and other programs, mobile applications and functions that are implemented on host server 105. An example of three client systems is shown in FIG. 1, but in general there may be any number of client systems 115 corresponding to different users registered within data processing system 100 as described herein.

Client systems 115 may include one or more interconnected hardware devices that are configured for two-way network communication with host server 105 through an access program, such as a mobile or computer application, web browser, or other type or configuration of network interface. For example, client systems 115 may in some cases execute the front end of a user or client application including functions such as displays, visualizations, and presentations, user interfaces, data inputs and outputs, error alerts and notifications, alarms, and so on, as well as communicate with the application backend that is being implemented on host server 105. Likewise the application backend can perform data processing functions, such as data storage and retrieval, verification, authentication, processing business logic, security, and others.

In some cases, host server 105 may be or include any local or on-premises computer system configured with hardware and/or software resources that allow local or remote access by client systems 115. Alternatively, host server 105 may instead be implemented on a distributed or cloud-based environment, such as Google™ Cloud Services, Amazon™ Web Service, or Microsoft™ Azure™ Cloud Computing Platform, which may be located remotely at one or more third party data centres.

Host server 105 provides a computing and data processing platform that is operable to coordinate the operation of data processing system 100 and deliver programs, applications, media, packets, and other electronic content to client systems 115 across network 110. Host server 105 can be implemented using or including a client-server configuration in which the exchange of data between host server 105 and client systems 115 is controlled using remote procedure calls and API-level communication. In some cases, host server 105 may also incorporate encryption, such as SSL or other suitable security protocols, to secure communication and exchange of confidential and/or personal information with client devices 115.

One or more data storage systems can be implemented within system 100 including, for example, both a networked (e.g., cloud-based or third party hosted) data warehouse 120 that is accessible to host server 105 over network 110 and/or a local data warehouse 125 that is dedicated to host server 105 directly. The number of different data storage systems 120,125 can vary in different implementations to support different applications. Each data storage system 120,125 can be any suitable type or configuration, such as an enterprise data warehouse (or data mart) used for business intelligence and analytics, a datalake, a transactional or operational datastore, or others, and can be implemented, for example, as memory, disk, or monolithic or distributed database configured to store information and data sets that are processed within a data processing layer of host server 105 as described herein.

In some cases, data storage systems 120,125 may be or include any local or on-premises computer system that is network-enabled or otherwise in communication with host server 105. Alternatively, either or both of data warehouses 120, 125 may also be implemented on a distributed or cloud-based environment, such as Google™ Cloud Services, Amazon™ Web Service, or Microsoft™ Azure™ Cloud Computing Platform, which may be located remotely at one or more third party data centres, or may in some cases be instead third party hosted by a managed database services provider.

The networked environment shown in FIG. 1 that provides an example data processing system 100 is for illustration purposes only. Different implementations and/or architectures will be possible to fit different use cases of a data processing system 100 that generates and delivers different content to client systems 115.

Figure 2:
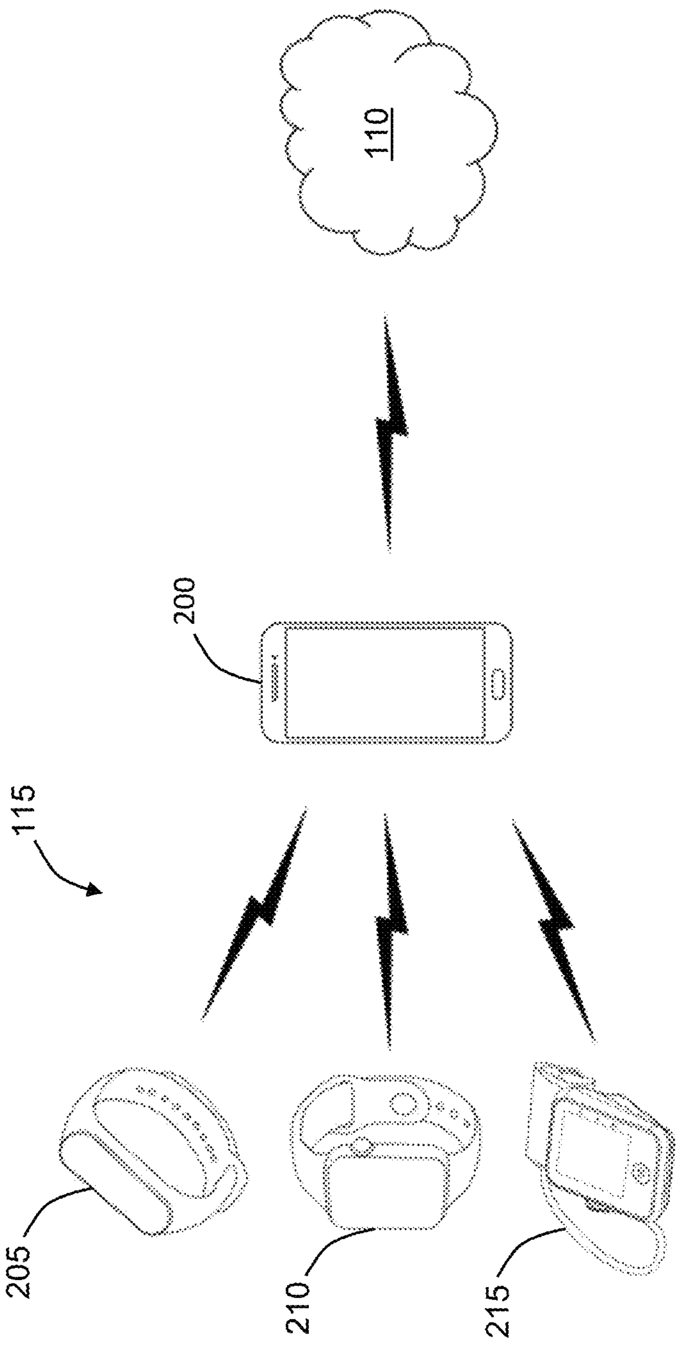
FIG. 2 shows an example configuration of a client system that can be included in the data processing system of FIG. 1.

FIG. 2 shows an example configuration of a client system 115 including an electronic device 200 that is or can be coupled to a number of different peripheral devices with which device 200 is configured to interoperate. Electronic device 200 can, for example, be any mobile or handheld wireless communication device, such as a cellular phone, smart phone, wireless organizer, personal digital assistant (PDA), notebook computer, tablet device, or the like, which is capable of establishing connectivity to network 110 and on which the user may execute different programs or applications. Electronic device 200 can connect to network 110 either wirelessly, as in the above examples, but also in some cases using other non-wireless communication protocols, as for example in the case of a desktop computer, handheld electronic game device, digital camera, and so on, which may be connected by ethernet and other types of network connections.

In accordance with some embodiments, electronic device 200 can couple or be coupled to one or more different connected devices such as, but not limited to, a fitness tracker 205, a smart watch 210, a personal medical device or sensor 215, such as a heart rate or blood pressure sensor, or some other type of wearable or connected device designed to detect or measure a physical or biometric user parameter. When worn and activated by the user of device 200, connected devices 205,210,215 can detect or monitor different metrics or user health parameters that are uploaded a connected program or application executing on mobile device 200 and which may then be transmitted over network 110 for processing by host server 105 as described further herein.

Example biometric parameters that connected devices 205,210,215 can be configured to measure may relate to different physiological data variables or metrics of the user, such as step count or another measure of distance travelled or energy expenditure, e.g., calorie burn, floors climbed and/or descended, heart rate, heartbeat waveform, heart rate variability, heart rate recovery, respiration, oxygen saturation, blood volume, blood glucose, skin moisture, location (e.g., via a GPS or GLONASS), and/or elevation. Other user biometric parameters that connected devices 205,210,215 may be configured to measure may include user blood pressure, blood glucose levels, skin conductivity, skin and/or body temperature; muscle state (e.g., as measured by electromyography), brain activity (e.g., as measured by electroencephalography), weight, body fat percentages, caloric intake, measures of sleep function (including bed and rise times, sleep phases, sleep quality and/or duration), pH levels, hydration levels, and respiration rate, for example.

In some cases, connected devices 205,210,215 can further be configured to measure or detect different environmental parameters, for example, barometric pressure, weather conditions (e.g., temperature, humidity, pollen count, air quality, rain/snow conditions, wind speed), light exposure (e.g., ambient light, UV light exposure, time and/or duration spent in darkness), noise exposure, radiation exposure, and/or magnetic field.

In addition to physical or biometric user parameters that are detected and measured by connected devices 205,210, 215, in some cases, electronic device 200 may also originate data or signals of interest that supplements or even substitutes for the data or signals generated by connected devices 205,210,215. For example, connected devices 205,210,215 may be monitoring user sleep activity when electronic device 200 registers that the user has received (answered) or placed a phone call, or some other interaction from the user.

If connected devices 205,210,215 had determined that the user is asleep during this period when that is not in fact the case, the data or signals from electronic device 200 may correct the erroneous signal reading from connected devices 205,210,215.

Data or and biometric parameters that connected devices 205,210,215 can be communicated wirelessly to electronic device 200 using a short-range communication protocol such as through connection to a wireless access point, personal area network (PAN), Bluetooth pairing, or wireless local area network (WLAN). In some cases, connected devices 205,210,215 can pair wirelessly with a mobile application or program executing on electronic device 200 that is configured to fetch or receive detected user biometric parameters from connected devices 205,210,215.

Figure 3:
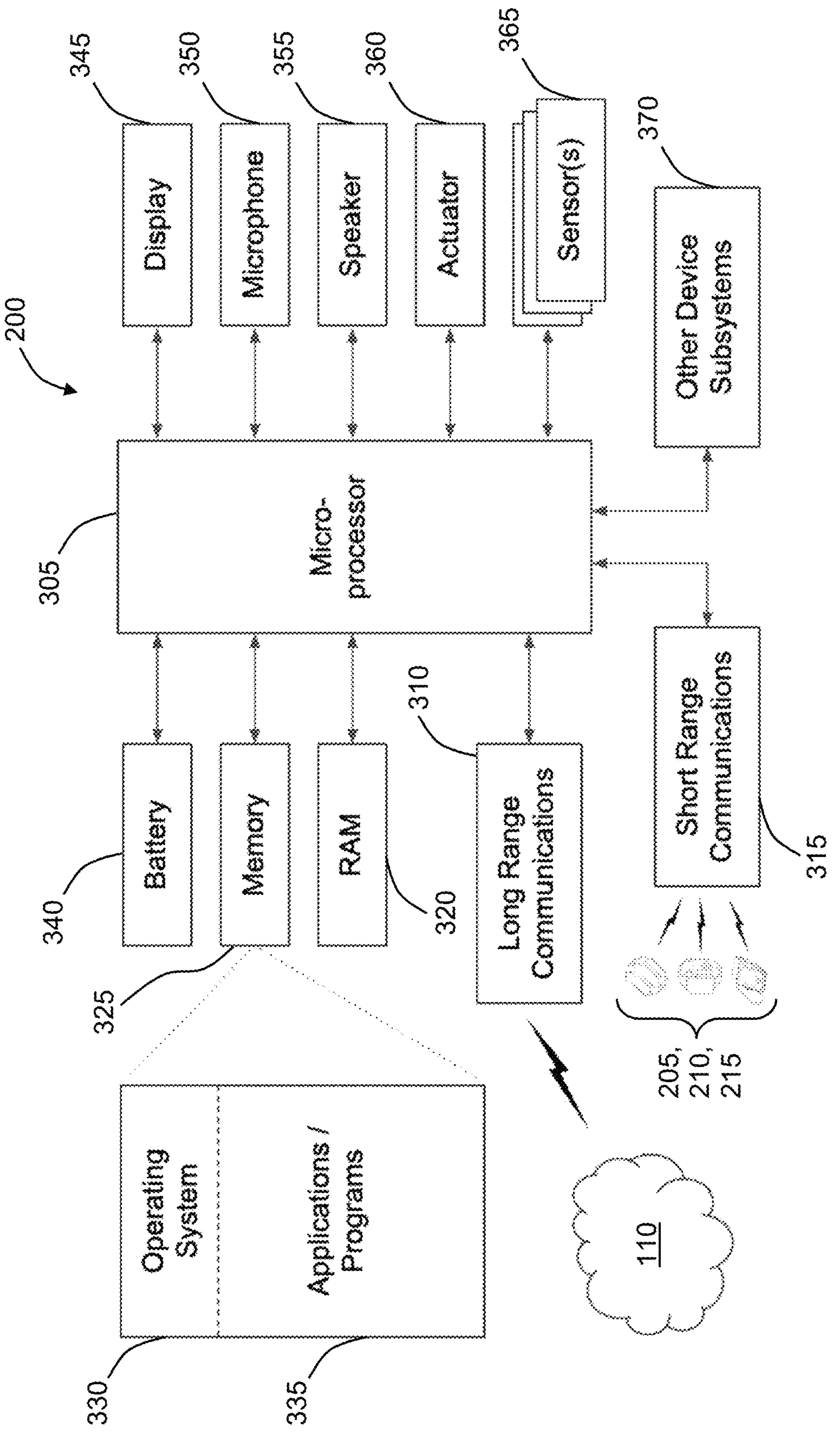
FIG. 3 shows an example configuration of an electronic device that can be included in the client system of FIG. 2.

FIG. 3 illustrates an example configuration of electronic device 200 in accordance with the example embodiments disclosed herein. Electronic device 200 includes multiple integrated components, including a microprocessor 305 that controls the overall operation of electronic device 200. Long-range communication functions, including data and voice communications, are performed through a long-range communication subsystem 310, which receives messages or data packets from, and sends messages or data packs, to a wide area network, such as network 110 shown in FIG. 2. As described herein, network 110 can be any type of wide area network, including, but not limited to, a wired network, a data wireless network, voice wireless network, and dual-mode wireless networks that support both voice and data communications over the same physical base stations.

In accordance with the described embodiments, electronic device 200 may also include a short-range communication subsystem 315 that enables communication over local area or short-range wireless networks. For example, short-range communication subsystem 315 may include transmitters and receivers that are configured according to Bluetooth™, near field communication (NFC), and other communication protocols that are intended for communications between paired electronic devices over short distances. For example, electronic device 200 may use short-range communication subsystem 315 to enable interconnectivity with connected devices such as fitness tracker 205, smart watch 210, or personal medical device or sensor 215 that are depicted in FIG. 2.

Electronic device 200 may generally also include or be provided with random access memory (RAM) 320 and a memory 325, such as a hard drive, flash memory, or other persistent storage device, in which can be stored an operating system 330 and/or one or more functional applications or programs 335 that are executable by microprocessor 305. Applications or programs 335 can be either pre-loaded onto electronic device 200 or, in some cases, loaded or downloaded onto electronic device 200, for example, by the user accessing network 110 using long-range communications subsystem 310.

In some embodiments, electronic device 200 can be powered using an onboard battery 340, which can be a rechargeable battery designed for use in mobile electronic devices, such as a nickel-cadmium (NiCd), nickel metal hydride (NiMH), lithium-ion (Li-Ion), lithium polymer (Li—Po), and the like. Alternatively, in some embodiments, battery 340 can be replaced with and/or include a fixed power supply or adapter for a fixed power supply, such as an electrical grid.

When operated, a user can interact with electronic device 200 by way of one or more different input/output devices or components that can be included in different configurations of electronic device 200. For example, in some cases, electronic device 200 may also be equipped with a display 345, which may include a touch-sensitive screen, microphone 350, speaker 355, actuator 360, which can be an accelerometer, sensor(s) 365, and other device subsystems 370 generally without limitation.

Received signals, such as text messages, e-mail messages, instant messages, or web pages, may be processed by either long- and short-range communication subsystems 310,315 and then provided to microprocessor 305. Signals and data received at microprocessor 305 may then be routed to different subcomponents of device 200, such as an application or program 335, display 345, speaker 355, and so on in accordance with operation of the device 200. Users may also compose data items, such as text or email messages, using the touch sensitive display 345 or other input components, which messages can then be transmitted over network 110 using long-range communications subsystem 310.

In general, when operated by a user, electronic device 200 can be used to download and store any number and type of applications or programs 335 of the user's choosing. Often, but not necessarily, such applications or programs 335 can be retrieved and downloaded from an internet site or application repository, such as a mobile app store, to suit the user's interests. Some users may elect to download applications or programs 335 that are intended for the user to monitor and track general health and wellness.

In accordance with the described embodiments, a user may download an application or program 335 onto electronic device 200 that is compatible with one or more of connected devices 205,210,215 shown in FIG. 2. Depending on the nature of the connected device 205,210,215, the user may configure connected device 205,210,215 to measure or track one or more different parameters or metrics of interest for the user. For example, the tracked parameter or metrics of interest may be any one or more of the examples that connected device 205,210,215 is or may be configured to monitor.

For any user metric or parameter of interest that connected device 205,210,215 may measure, a data stream containing those measurements may be transmitted by electronic device 200 through network 110 for processing by host server 105 in order to generate a baseline measurement of the user's habits or patterns and/or a regularity score indicative of the user's adherence to their established habits or pattern of behaviour. Host server 105 may then transmit the computed regularity back to electronic device 200 for display to the user and/or for use by the user's mobile application to drive other health-related actions, recommendations, or outcomes.

Figure 4:
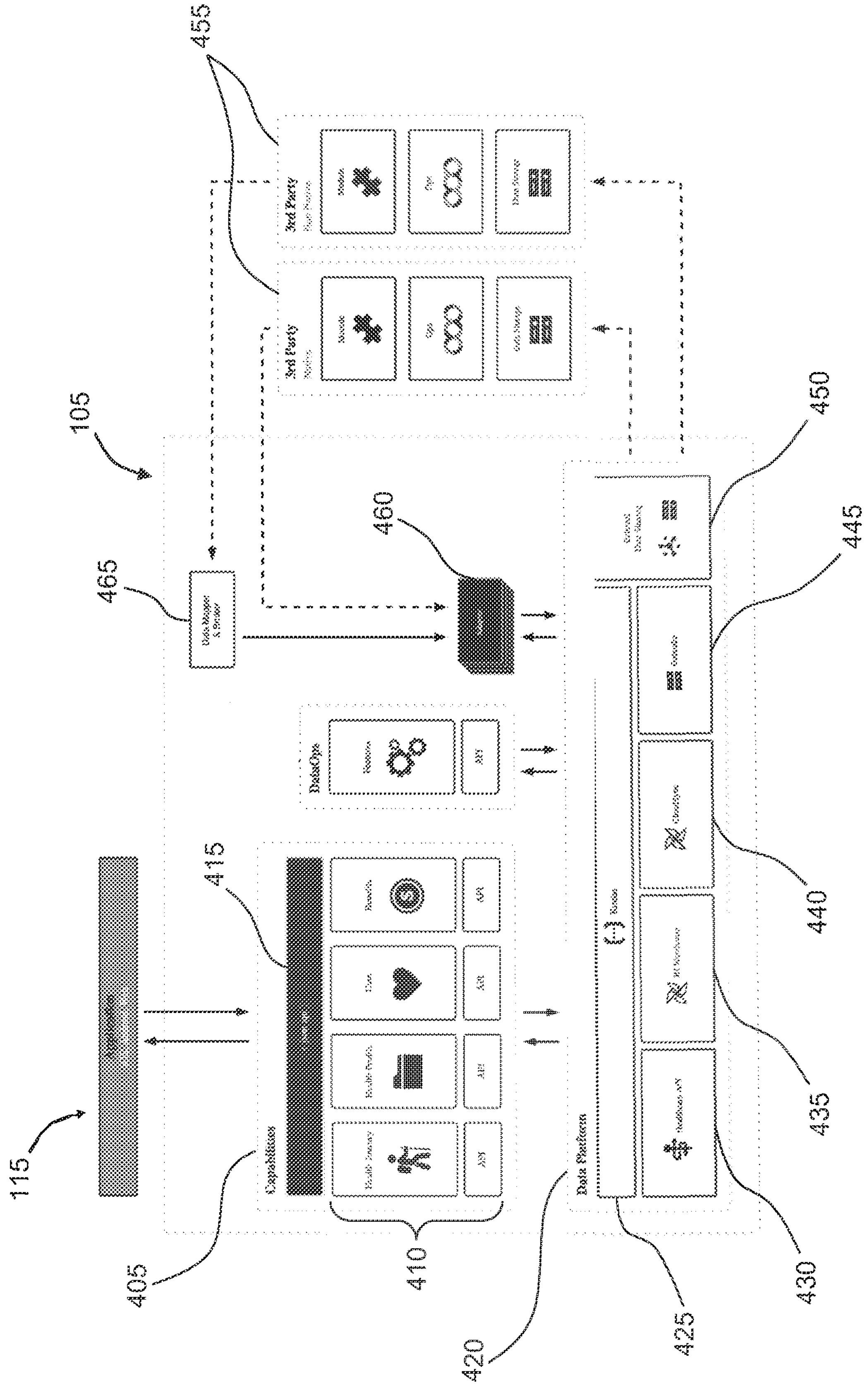
FIG. 4 shows an example configuration of a host server that can be included in the data processing system of FIG. 1.

FIG. 4 illustrates an example configuration of host server 105 in accordance with the embodiments disclosed herein. In the example shown, host server 105 includes a capability layer 405, in which a number of modules 410 are implemented, and a data platform 420 that is integrated with capability layer 405. Modules 410 are of any generally different function, number, and configuration and may be called by a front end application executing on a client system 115 (such as is shown in FIG. 2), by way of API 415, which can be a JSON API, for example, or some other configuration that enables data exchange between client system 115 and host server 105.

Each module 410 may communicate with the data platform 420 by way of a corresponding API exposed by that module 410 for data exchange with other modules 410 and across the data platform 420. As described further below, each API exposed by a module 410 may enforce and be configured according to an interoperability standard for exchange of data that has been adopted intrinsically by data platform 420 and capability layer 405 for operations. This data exchange standard may in some cases be the FHIR™ standard and data platform 420 may then correspondingly be configured to store and process data in FHIR™ format in its own internal operations, not just on exchange or interoperation with third party systems, clients, or applications that are external to host server 105.

As described further below with reference to FIG. 6, data platform 420 can include a router 425 configured to transmit and receive data to and from modules 410 in the capability layer 405. In some embodiments, data platform 420 can further include one or more additional components such as cloud storage 430, which can be an API configured according to the specified interoperability standard, e.g., so that data can be put into or retrieved from cloud storage 430 by data platform 420 directly in the specified data schema without conversion or re-formatting. Additionally, data platform 420 can in some cases include a business intelligence (BI) warehouse 435 that maintains one or more analytics objects, cloudsync 440 that provides either real-time or batched synchronization between data platform 420 and one or more connected data stores, datalake 445, and external data share 450 that can be used to export data from server 105 to any third party sources 455.

Data can be received into data platform 420 from third party sources 455 that include both native (configured according to the specified interoperability standard) and non-native (configured according to a different data standard) third party sources. Third party sources 455 may in general correspond to any external entity that transmits data to or from host server 105, such as a third party service provider or extension. Data provided from a third party source 455 that is already configured according to the specific interoperability standard is received by adaptor 460 wherein it may be further configured or formatted for ingestion into data platform 420, e.g., in accordance with capability requirements of one or more functional modules 410. If the data being received from third party source 455 is not formatted according to the interoperability standard, rather than being provided directly to adaptor 460, it may instead be first received by data mapper and broker 465 for conversion into the specified interoperability standard. In some embodiments, data mapper and broker 465 may additionally enforce data contracts or other limitations on the types and kind of data received from third party sources 455 as required or desired. While illustrated in FIG. 4 as separate components, alternatively, adaptor 460 and data mapper and broker 465 may in some cases be implemented jointly or within a single module or element of host server 105.

Figure 5:
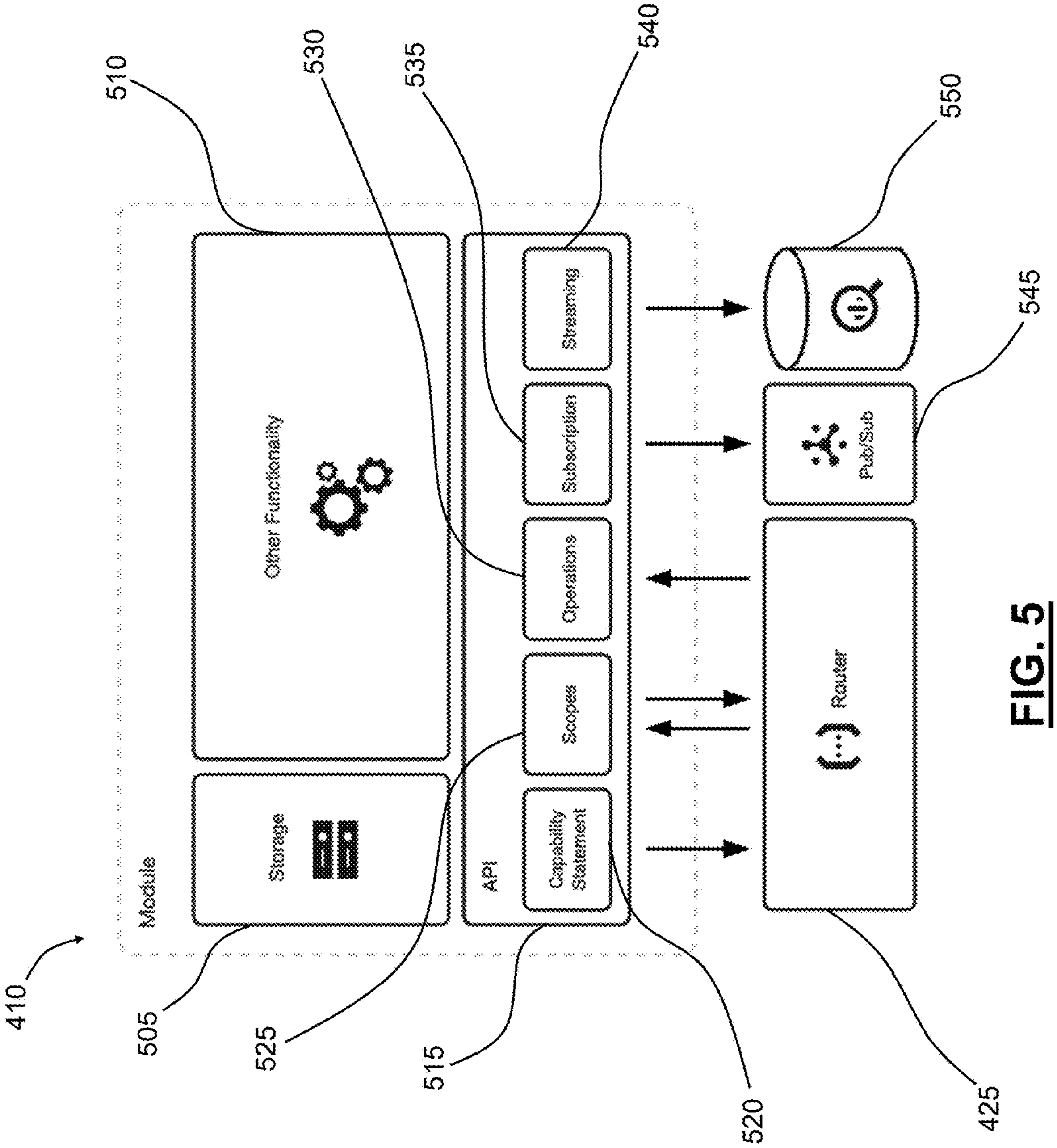
FIG. 5 shows an example configuration of a functional module that can be implemented on the host server configuration of FIG. 4.

FIG. 5 illustrates an example configuration of a capability module 410 in accordance with the embodiments disclosed herein. Capability module 410 includes, for example, storage 505, other programmatic functionality 510 that operates on data stored in storage 505 to provide the functionality of module 410, and API 515. As described above, all of the data stored in storage 505 can be formatted according to the specified interoperability standard, which, in some cases, can be the FHIR™ standard. Data storage 505 can be any type of storage that is compatible with the specified interoperability standard and the other functionality 510 of module 410, such as a cloud based storage offered by a third party IaaS provider. In some cases, data storage 505 can be implemented by a FHIR™ based cloud storage API, for example. API 515 can also be configured for capability with the specified interoperability standard and data schema as explained herein.

For example, in order to facilitate communication with router 425 (described further below with reference to FIG. 6), API 515 may generally include a capability Statement 520 that functional module 410 exposes in order enable interoperation with other networked resources, such as router 425, by constraining the types of resources, profiles, operations, subscription topics, or other parameters that are supported by that module 410. In general, each different module 410 may expose a corresponding capability statement 520 according to its own requirements that router 425 or other networked registers may access and register. Capability statement 520 may in this way generally impose at least one operational constraint on the processing of data by a functional module 410 and be defined based on at least one parameter of the interoperability standard.

In some embodiments, each API 515 may further include a scope 525 defined for that module 410 that is defined based on the at least one parameter of capability statement 520, and through which module 410 may advertise to router 425 the granular access (read, write, etc.) permissions that are enforced on the types of resources and profiles that have been implemented by that functional module 410. In this way, router 425 can moderate the exchange of data according to the requirements and permissions of each module 410 as defined by their respective capability statement 520 and scope(s) 525. API 515 may additionally define operations 530 that allow for data centric business logic to be exposed to router 425, for example, through the use of verbs or other parameters within API 515. Operations 530 may be used in some cases to create abstractions for business concepts used by functional module 410 (e.g., as part of other programmatic functionality 510) as part of its operational capability or, alternatively, for module 410 to maintain control or ownership of data by restricting the availability of certain data operations (such as write or create) from external users or networked resources.

Optionally, in some embodiments, API 515 may include additional elements or components including subscriptions 535 and streaming I/O 540. Subscriptions 535 can be utilized to provide a mechanism for external users to observe any changes or modifications made to the type of resources handled by functional module 410 as also reflected, for example, in an updated capability statement 520. Such changes can be broadcasted through one or more different communication channels, such as REST-hook, Websocket, e-mail, and other custom channels. In some cases, subscriptions 535 may communicate with a pub/sub module 545 for this purpose, whereby each functional module 410 is responsible for defining which resources are observable and the granularity of the topics that are provided to pub/sub module 545.

Streaming I/O 540 may be included in API 515 in order to provide either synchronous (e.g., real time) or asynchronous sharing of data to a data warehouse 550, for example, which can be configured as a business intelligence or analytics database, or which is used for external data sharing, disaster recovery, to provide auxiliary capabilities of module 410, or for some other purpose. In some cases, streaming I/O 540 may also be used to maintain an auditable record of data transactions.

Figure 6:
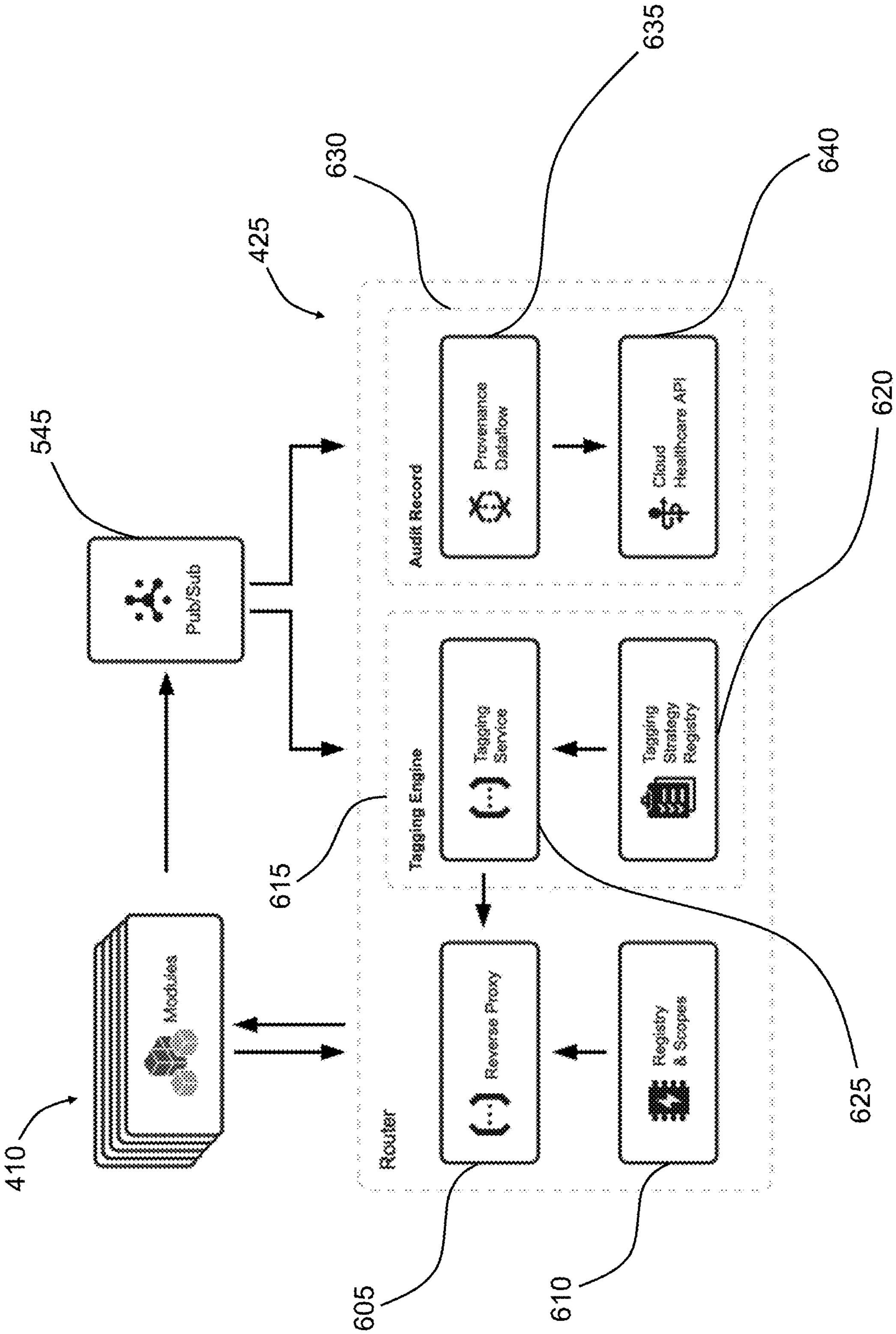
FIG. 6 shows an example configuration of a router that can be implemented on the host server configuration of FIG. 4.

FIG. 6 illustrates an example configuration of a router 425 in accordance with the embodiments disclosed herein. As described herein, router 425 is in electronic communication with each functional module 410 and controls data exchange therebetween and from other sources, such as third party sources 455 (see FIG. 4). In this way, router 425 can effectively unify all instances of functional modules 410 into a single, distributed server that operates on data formatted according to the specified interoperability standard or schema. This approach is both modular and scalable and, advantageously, provides data interoperability not just between third party sources 455, but also between capability layer 405 and data platform 420, and among all modules 410 that are incorporated into capability layer 405, without limitation.

Router 425 can in some cases be configured based on a federated model, in which each functional module 410 included within capability layer 405 can be responsible for the data on which it operates, but also wherein each functional module 410 communicates with each other functional module 410 by routing data messages through router 425 and from there on to its destination. This allows for communication among all functional modules 410 without requiring any single functional module 410 to know how any other functional module 410 has been configured, which also contributes to modularity and scalability.

Router 425 may include a reverse proxy 605 through which data is exchanged with each of the functional modules 410 and registry 610 in communication with reverse proxy 605 that stores an up to date list of permissible scopes that each functional module 410 has published or exposed to router 425. In the example configuration shown, all data traffic to and between functional modules 410 is routed through reverse proxy 605 operating in conjunction with scopes registry 610. Reverse proxy 605 can thereby enforce read/write access permissions for each module 410 based on the scope(s) that reverse proxy 650 retrieves from scopes registry 610. Advantageously, this allows router 425 to both regulate what data is accessible by each module 410 and, as described further below, to efficiently handle data traffic among modules 410 through selective routing of data requests to the correct destinations.

Referring back to FIG. 5, each functional module 410 can define and publish scopes 525 at certain pre-defined contexts (system, user, etc.) and for different resources or, in some cases, for different profiled resources, while at the same time specifying access controls such as create, read, update, delete, and search (sometimes referred to as "cruds"). As functional modules 410 may utilize the same or some of the same resources as other functional modules 410, a scope defined solely based on resource type would not generally be unique for that functional module 410. In some cases, at least two functional modules 410 may utilize the same resource and enforce the same access controls resulting in an identical scope. In such case, router 425 would not be able to as efficiently route data requests to functional modules 410 because for some requests, router 425 would not be able to effectively disambiguate which of two or more functional modules 410 had requested or is the destination for a data packet as, from the perspective of router 425, these two functional modules 410 would be undifferentiated from each other as destinations for data handled by router 425

To overcome this, in accordance with the described embodiments, each functional module 410 may be configured to adopt profiled resources that are effectively unique to that functional module 410, in which case each functional module 410 may then also correspondingly define a unique scope based on that profiled resource. For example, assume that two functional modules 410 each utilize the same resource, such as an observation resource, with equivalent read and write permissions. To provide differentiation, the two functional modules 410 may each define respective profiles as follows: {module1-observation, module2-observation), which can be parameterized as profile (n)=modulen-observation for any arbitrary number of other functional modules 410. Thus, by invoking the name of the functional module 410 in its corresponding profile, no two profiles will be the same across all modules 410 so long as each functional module 410 has a unique name or identifier. The full profiled scopes for these two functional modules 410 may then take the following form, for example: {system/Observation.cruds?_profile=module1-observation, system/Observation.cruds?_profile=module2-observation}.

Referring back to FIG. 6, the available scopes published by each functional module 410 are, as described above, retrieved by router 425 and stored in scopes registry 610 to be used by reverse proxy 605 in determining how and where to route data packets. By formatting all data and data requests processed by router 425 to include at least one profiled resource in accordance with the specified interoperability standard, reverse proxy 605 is able to apply scopes retrieved from scope registry 425 to all data traffic in order to efficiently route the data request to the applicable destination in the form of a give functional module 410 or, in some cases, to two or more functional modules 410 concurrently.

In some embodiments, router 425 generally and reverse proxy 605 specifically are able to process non-profiled requests, in addition to profiled requests as described herein through the use of scopes. A non-profiled request, in contrast to profiled requests, may be sent to all functional modules 410 in an undifferentiated fashion without restricting or limiting which of functional modules 410 are queried. General requests of this nature, while possible, may come with certain disadvantages such as inefficient routing as well as limitation on reverse proxy 605 acting as a streaming proxy, because the responses of querying multiple functional modules 410 concurrently would in such case be processed and combined together into a single aggregate response.

Some implementations of router 425 may include a tagging engine 615 that can be utilized to process data traffic handled by reverse proxy 605 by writing to one or more fields of metadata in such data packets that are supported by the specified interoperability standard. While in some cases, data packets may be tagged by the individual functional modules 410 that process or utilize, in other cases, it may be preferable or advantageous to utilize router 425 and tagging engine 615 more specifically to deploy a centralized or global tagging strategy across all functional modules 410 in order to avoid individual functional modules 410 utilize different tagging strategies.

For example, as shown, tagging engine 615 may include a tagging strategy registry 620 that maintains an index of tag collections for data processed by functional modules 410. The tag collections may, for example, correspond to different segmentation strategies or other ways to organize or categorize the data into different subsets including for personalization of user experience. Using a common index of tag collections in this manner can provide for uniform data categorizations across all functional modules 410. Tag collections may be saved in tagging strategy registry 620, for example, using a suitable resource in the specific interoperability standard that allows for the querying of data through router 425.

Tagging engine 625 may monitor the data being processed in functional modules 410 through pub/sub service 545, for example, including the addition, modification, or deletion of data by any given functional module 410. Tagging service 625 included in tagging engine 615 may, in response to such events, write to data packets passing through reverse proxy 605 by pulling the appropriate tag(s) from the index maintained in tagging strategy registry 620.

In some embodiments, router 425 may further include an audit record 630 that utilizes one or more resources in the specific interoperability standards, for example, AuditEvent and Provenance resources, in order to preserve a record of operations performed on data objects. Thus, in some cases, audit record 630 may be provided with a record of all operations performed by functional modules 410 through a suitable subscription to pub/sub service 545. Provenance dataflow 635 may transform the stream of operations received from pub/sub service 545 into the relevant AuditEvent and Provenance resources, for example, so as to record when, what, and/or who performed an operation on data resources, on an anonymized basis, without holding any individually identifiable data or information. Such records may then be provided by provenance dataflow 603 to an API 640, which can be configured as a non-federated API instance that is compatible with the specified interoperability standard, for storage and later use.

Figure 7:
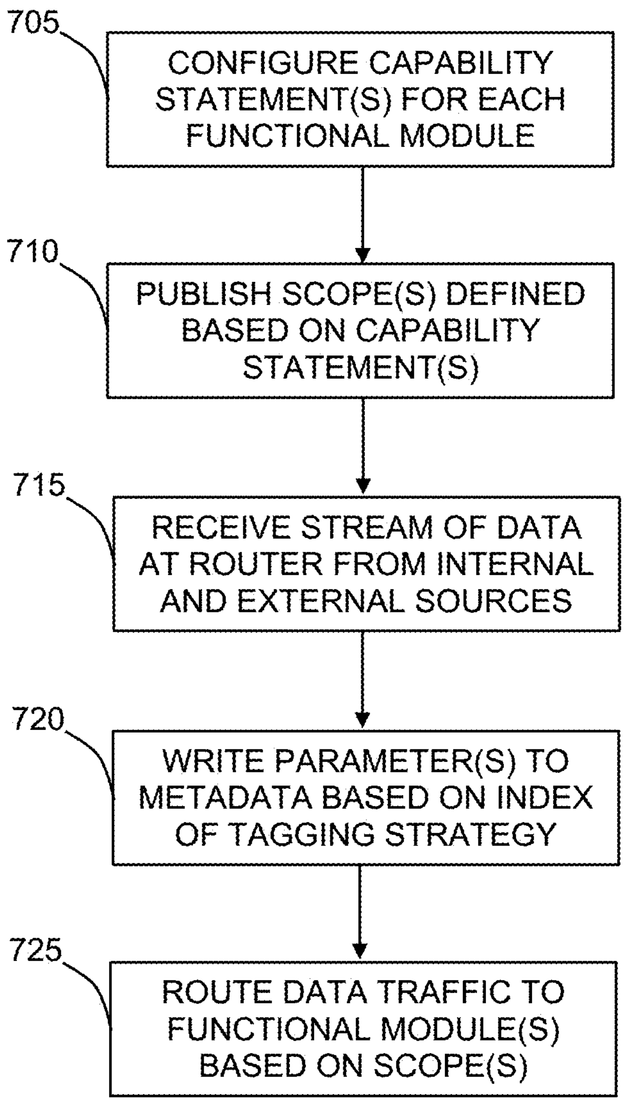
FIG. 7 shows an example method of processing data in accordance with embodiments of the invention(s) described herein.

FIG. 7 illustrates an example method 700 of processing data in accordance with the described embodiments. Method 700 may be performed, for example, by data processing system 100 shown in FIG. 1, and more particularly utilizing the configuration of host server 105 shown in FIG. 4, in order to implement a capability layer comprised of one or more functional modules that intrinsically process data that has been formatted according to a specific interoperability standard or schema, which can in some cases be the FHIR™ standard. The example implementation of method 700 shown in FIG. 7 is for illustrative purposes only. According to different implementations of method 700, individual steps or processes may be performed in a different order than as shown, by a different component, or omitted entirely, while additional steps and/or sequences not illustrated in the example method 700 may also be included as described herein generally without limitation.

For example, as illustrated, method 700 may begin at 705 by configuring a corresponding capability statement for each of one or more functional modules, such as the configuration of functional module 410 shown in FIG. 4, and which are included within a capability layer of a data processing system, such as is configured on host server 105 of data processing system 100. Each capability statement may be defined based on one or more parameters of a specified interoperability standard, such as the FHIR™ standard, which can be utilized for the exchange of formatted electronic data. One or more scopes may also be defined for each of the functional modules based on the included parameters of the respective capability statement and published at 710 by the corresponding functional module. For example, an API that has been suitably configured in accordance with the specified interoperability standard may be utilized to expose the capability statement and scope(s) for each of the functional modules.

At 715, a stream of data consisting of one or more individual data packets originating from different sources may be received at a router. As explained here, the data may originate both from internal sources, such as one or more of the functional modules, as well as sources that are external to the host server or data processing system. In general, data packets received from functional modules will already be formatted in accordance with the interoperability standard, while data from external sources may not be. Unformatted data may be adapted as necessary before being provided to the router for compatibility with the specified interoperability standard or schema.

At 720, in some cases, the router may process the stream of data by writing to the metadata of individual data packets. For example, data packets may be tagged according to the pre-populated index or collection of tags as described herein for different purposes, such as data segmentation or categorization, or to enable the capabilities of different functional modules more generally.

Data packets received by the router at 715, and optionally tagged at 720, may then at 725 be forwarded on to one or more of the functional modules through enforcement of the permissions or restrictions contained within the respective scope(s) that each functional module made available for retrieval by the router for this purpose, as described herein.

Other aspects of method 700 and its operation in various different embodiments are as described herein with reference to data processing system 100 and host server 105 shown in drawings and for the sake of expediency will not be described further.

Although the disclosure has been presented with reference to certain specific embodiments, various modifications thereof will be apparent to those skilled in the art without departing from the scope of the disclosure. The scope of the claims should not be limited by the illustrative embodiments set forth in the examples, but should be given the broadest interpretation consistent with the description as a whole.

The invention claimed is:

1. A system for processing data formatted in accordance with an interoperability standard for electronic exchange of data, the system comprising:
 at least one functional module within a capability layer, each functional module configured to
  include a capability statement that imposes at least one operational constraint on the processing of data by the functional module wherein the capability statement is defined based on at least one parameter of the interoperability standard; and
  publish at least one scope that imposes a set of permissions and restrictions on the data processed by the functional module wherein the at least one scope is defined based on the at least one parameter of the capability statement; and
 a router in electronic communication with each functional module, the router configured to, for each functional module, control the flow of data to and therefrom based on the corresponding at least one scope published by that functional module and accessed by the router.

2. The system of claim 1, wherein the router comprises a scope registry configured to store the at least one scope published by each of the at least one functional modules.

3. The system of claim 2, wherein the router comprises a reverse proxy in communication with the scope registry, wherein the reverse proxy is configured to route data traffic to and from each functional module by enforcing the corresponding at least one scope stored in the scope registry.

4. The system of claim 1, wherein the router comprises a tagging engine in communication with the reverse proxy, the tagging engine is configured to receive notification from the at least one function module of new data events and to write metadata to the data packets being processed by the reverse proxy corresponding to the new data events.

5. The system of claim 4, wherein the tagging engine comprises a tagging strategy registry that maintains a pre-populated index of data tags, and a tagging service configured to access the tagging strategy registry and apply labels retrieved from the tagging strategy registry to the metadata of the data packets being routed through the reverse proxy.

6. The system of claim 1, wherein the router comprises an audit record configured to capture and record new data events instigated by operation of the at least one functional module.

7. The system of claim 1, wherein each functional module comprises an API formatted in accordance with the interoperability standard, and the corresponding capability statement and at least one scope are each exposed to the router through the API.

8. The system of claim 1, further comprising a data mapper configured to convert data received from external sources into the interoperability standard.

9. The system of claim 8, further comprising an adapter coupled between the data mapper and the router, the adapter configured to process the data received from the external sources in accordance with the operational constraints imposed on the at least one functional module by the corresponding capability statement.

10. A method of processing data comprising:

for each of at least one functional module included within a data processing system, configuring a capability statement that imposes at least one operational constraint of the processing of data by the functional module wherein the capability statement is defined based on at least one parameter of an interoperability standard for electronic exchange of data; and publishing at least one scope that imposes a set of permissions and restrictions on the data processed by the functional module wherein the at least one scope is defined based on the at least one parameter of the capability statement; and receiving a flow of data at a router in electronic communication with each functional module and directing the received flow of data to the at least one functional module selectively based on the corresponding at least one scope published by the at least one functional module and accessed by the router.

11. The method of claim 10, further comprising storing the at least one scope published by each of the at least one functional modules in a registry maintained within the router.

12. The method of claim 11, further comprising directing data traffic to and from the at least one functional module through the router by enforcing the corresponding at least one scope stored in the registry for each of the at least one functional module.

13. The method of claim 10, further comprising receiving notification from the at least one function module of new data events and writing metadata to the data packets being processed by the reverse proxy corresponding to the new data events.

14. The method of claim 13, wherein writing the metadata to the data packets comprises retrieving labels from a pre-populated index of data tags and applying the labels to the data packets being routed through the reverse proxy.

15. The method of claim 10, further comprising exchanging data with the router through a corresponding API included in each functional module that is formatted in accordance with the interoperability standard.

16. The method of claim 10, further comprising converting data received into the data processing system from external sources into the interoperability standard.

17. The method of claim 16, further comprising processing the data received from the external sources in accordance with the operational constraints imposed on the at least one functional module by the corresponding capability statement.

18. A router for controlling the flow of data between at least one functional module included within a data processing system, the router comprising:

a scope registry configured to store, for each of the at least one functional module, at least one scope published by that functional module, wherein the at least one scope is defined based on at least one parameter of a capability statement included within the corresponding functional module, the capability statement imposing at least one operational constraint on the processing of data by that functional module and defined based on at least one parameter of an interoperability standard for electronic exchange of data within the data processing system; and a reverse proxy in communication with the scope registry, wherein the reverse proxy is configured to route data traffic to and from each functional module by enforcing the corresponding at least one scope stored in the scope registry.

19. The router of claim 18, further comprising a tagging engine in communication with the reverse proxy, the tagging engine is configured to receive notification from the at least one function module of new data events and to write metadata to the data packets being processed by the reverse proxy corresponding to the new data events.

20. The router of claim 19, wherein the tagging engine comprises a tagging strategy registry that maintains a pre-populated index of data tags, and a tagging service configured to access the tagging strategy registry and apply labels retrieved from the tagging strategy registry to the metadata of the data packets being routed through the reverse proxy.

* * * * *